United States Patent [19]

Nevrekar

[11] Patent Number: 5,407,176
[45] Date of Patent: Apr. 18, 1995

[54] BACK-SEATING OF ROTARY VALVE STEM

[76] Inventor: Venkatesh R. Nevrekar, 6 Castle Creek Pl., Shawnee, Okla. 74801

[21] Appl. No.: 209,701

[22] Filed: Mar. 10, 1994

Related U.S. Application Data

[63] Continuation-in-part of Ser. No. 107,292, Aug. 12, 1993, abandoned.

[51] Int. Cl.6 .............................................. F16K 5/06
[52] U.S. Cl. .................................... 251/214; 251/296; 251/309
[58] Field of Search ................ 251/214, 296, 309, 330

[56] References Cited

U.S. PATENT DOCUMENTS

| | | |
|---|---|---|
| 2,076,841 | 4/1937 | Heggem . |
| 2,124,334 | 7/1938 | Gray . |
| 2,383,549 | 8/1945 | Hilker . |
| 2,392,880 | 1/1946 | Reed . |
| 2,443,995 | 6/1948 | Snyder . |
| 2,628,059 | 2/1953 | Himuchs .......................... 251/296 X |
| 2,719,022 | 9/1955 | Blevans . |
| 3,425,663 | 2/1969 | Priese ............................... 251/214 X |
| 3,794,297 | 2/1974 | Aver et al. ....................... 251/330 X |
| 4,101,113 | 7/1978 | Plessing . |
| 4,234,157 | 11/1980 | Hodgeman et al. . |
| 4,305,567 | 12/1981 | Lunt ..................................... 251/314 |
| 4,531,537 | 7/1985 | Smith ............................... 251/214 X |
| 5,129,624 | 7/1992 | Icenhower et al. . |
| 5,205,535 | 4/1993 | Nevrekar . |

Primary Examiner—John C. Fox

[57] ABSTRACT

A rotary valve assembly comprising a valve body having a stem passageway in communication with the valve body cavity which contains a closure member for selectively closing or opening the fluid flow passageway intersecting the valve body cavity. A valve operator consisting of a reciprocatable and rotatable stem passing through the stem passageway is connected to the closure member so that when the stem rotates, the closure member rotates together with the stem. The stem is provided with a back-seat and the valve operator reciprocates the stem to unseat and reseat the stem onto the stem seat located on the valve body surrounding the stem passageway in order to seal the stem passageway from the valve body cavity. Sealing of the stem passageway isolates the stem packing from the fluid in the valve body cavity, prevents fugitive emissions related to stem leakage and prolongs the useful life of the stem packing.

20 Claims, 2 Drawing Sheets

FIG. 1-A

BACK-SEATING OF ROTARY VALVE STEM

RELATED APPLICATIONS

This application is a continuation-in-part of U.S. patent application Ser. No. 08/107,292 filed Aug. 12, 1993 entitled "BACK-SEATING of ROTARY VALVE STEM", now abandoned, the details of which are incorporated herein by reference.

BACKGROUND OF THE INVENTION

1. Field of the Invention

The present invention relates to valve assemblies of the rotary type in which the stem is provided with a mechanically loaded back-seat with externally variable stem seating force so as to prevent fugitive emissions by isolating the stem packing from the fluid in the valve body cavity and thus prolonging the useful life of the stem packing.

2. Brief Description of Prior Art

Valves are used in large numbers in the process industry handling fluids of all kinds and they are the major contributor to overall fugitive emissions in the industry. Fugitive emission is referred to any fluid, hazardous or otherwise, leaking through any part of a closed piping system. Leakage around the valve stem through the stem packing is a significant cause of fugitive emissions. The Clean Air Act establishes stringent guidelines for control of fugitive emissions.

A common method of controlling leakage around the valve stem is to provide a stem seal that includes the use of a stuffing box that is packed with material such as graphite or fluoropolymers. The bolted gland of the stuffing box exerts compressive force on the packing material which in turn exerts radial thrust around the stem periphery to seal the stem passageway. When the stem packing is newly installed, the leakage around the stem is minimal. But when the valve is used, the stem reciprocates and/or rotates inside the packing material which eventually wears out and the radial thrust around the stem periphery relaxes. The decreased radial thrust reduces the sealing effectiveness around the stem, thereby permitting fluid in the valve body cavity to leak along the stem passageway. In order to reduce fluid leakage, the stuffing box packing is tightened axially in order to increase the radial sealing thrust around the stem. The stuffing box packing is also replaced periodically with new packing material. Another method to reduce fugitive emissions around the stem is to put stem packing under "live loading" with springs which provides a constant compressive force on the stem packing.

The above method of stem packing only controls fugitive emission and does not prevent it. Fugitive emission around the stem can be prevented only by isolating the stem packing from the fluid in the valve body cavity.

In valves that are in use today, only non-rotary valves with reciprocating stems are provided withback-seats that can be loaded with externally variable stem seating force. So far it has been found very difficult and elusive to provide back-seats on rotary valve stems that can be loaded with externally variable stem seating force that automatically adjusts to wear of the seating surfaces. Some current rotary valves like plug and ball valves are provided with stems that have back-seats which are either fluid pressure energized or loaded with springs which provide a constant seating force and do not automatically self-adjust for wear.

Therefore, there exists a need today in which rotary valves could be provided with back-seats for the stem whereby the back-seating force automatically self-adjusts for wear of the seating surfaces independent of fluid pressure.

Prior art Blevans U.S. Pat. No. 2,719,022 of Sep. 27, 1955 does show a rotary valve in which the stem passageway is sealed from the valve body cavity. But this sealing is not effective because of stem back-seating and the sealing force is not automatically externally variable. The sealing of the stem passageway is caused by plastic packing injected under pressure around the outer periphery of a stem sealing ring located in the valve body around the stem in the stem passageway. This method is not foolproof by any means. The method is not a positive way to seal the stem passageway from the valve body cavity. The sealing integrity around the stem will be compromised, if there is a drop in the pressure of the injected plastic packing material and this is bound to happen sooner or later. Secondly, there is no automatic self-adjustment for wear of the seating surfaces. Also the plastic packing will have to be injected under such a high pressure that resistance to stem rotation will be encountered. Blevans rotary valve is extremely complex and expensive for manufacture and sealing around the stem in the stem passageway cannot be assured.

Prior art Gray U.S. Pat. No. 2,124,334 shows a gate valve wherein the stem is back-seated in both opened and closed positions of the valve. However, Gray U.S. Pat. No. 2,124,334 applies to a reciprocating gate valve wherein the closure member reciprocates between open and closed positions of the valve. Also during Gray's times there was no pressing need for the prevention of fugitive emissions. The instant patent application refers to rotary valves only in which the closure member rotates during open and closed positions of the valve.

BRIEF DESCRIPTION OF THE PRESENT INVENTION

This invention is concerned with prevention of fugitive emission associated with leakage around the valve stem of a rotary valve. The fugitive emission is prevented, rather than contained, by isolating the stem packing from the fluid in the valve body cavity and is achieved by providing a back-seat on the stem which seals the stem passageway from the valve body cavity. The back-seat on the stem is located just below the stuffing box, that is between the stem packing and the valve body cavity. The stem back-seat is mechanically loaded with automatically self-adjusting seating force that is externally variable.

A rotary valve comprising a valve body cavity and a fluid flow passageway therethrough intersecting the valve body cavity, has a stem passageway in communication with the valve body cavity. A flow control member is disposed in the valve body cavity for selectively closing or opening the fluid flow passageway. A valve operator is connected to the flow control member for selectively moving the flow control member to a flow closed position or to a flow open position. The valve operator consists of a movable stem that reciprocates in the stem passageway and is connected to the flow control member so that when the stem rotates, the flow control member rotates with the stem.

The stem passageway has a stem seating surface surrounding the stem passageway. The stem has a stem sealing surface disposed around the stem complementary to and facing the stem seating surface surrounding the stem passageway. When the stem sealing surface is forced against the stem seating surface by the valve operator, the stem sealing surface sealingly engages the stem seating surface and thus prevents fluid in the valve body cavity from communicating with the stem packing located above the stem seating surface. The stem seating surface is located between the stem packing and the valve body cavity. The valve operator provides the externally variable seating force needed to achieve effective sealing at the stem back-seat. The valve operator automatically self-adjusts the stem seating force as needed.

When the valve operator is moved in one direction, the stem sealing surface moves a limited extent away from the stem seating surface just enough to facilitate stem rotation, the stem then rotates with the flow control member through a predetermined interval of rotation. Continued further movement of the valve operator in the same direction causes the stem sealing surface to move along the stem axis towards the stem seating surface to sealingly engage the stem seating surface. Thus the stem passageway is sealed from the valve body cavity. This sequence of stem movement of unseating, turning and reseating the stem is generally called "Lift-Turn-and-Reseat" means.

The "Lift-Turn-and-Reseat" sequence of stem movement is repeated when the valve operator is moved in the opposite direction to selectively close or open the fluid flow passageway. Thus the stem passageway is sealed from the valve body cavity when the flow control member is in flow closed position as well as in flow open position. When the stem sealing surface moves a limited extent away from the stem seating surface to facilitate stem rotation, some little quantity of fluid might escape from the valve body cavity to the stem packing which provides a back-up seal for the very short duration during the stem rotation until the stem is reseated onto the stem seating surface. This type of back-seating of the rotary stem with just above described "Lift-Turn-and-Reseat" type stem movement is useful particularly for Ball, Butterfly and Plug types of rotary valves for preventing fugitive emissions of hazardous chemicals.

In some rotary valves, the stem passageway is not required to be sealed in the fluid flow closed position, particularly when the valve remains closed for very short periods and remains in fluid flow open position most of the time. In such instances, another sequence of stem movement called "Lift-and-Turn" is adopted to seal the stem passageway in the valve open position. "Lift-and-Turn" sequence is really a partial sequence of "Lift-Turn-and-Reseat" means. When the valve operator is moved in one direction, the stem sealing surface moves a limited extent away from the stem seating surface along the stem axis to facilitate stem rotation. With continued further movement of the valve operator in the same direction, the stem rotates together with the flow control member through a predetermined interval of rotation to close the fluid flow passageway. When the valve operator is moved in the opposite direction, the said sequence of stem movement is reversed. That is, first the stem rotates together with the flow control member through a pre-determined interval of rotation and then the stem reseats on the stem seating surface to sealingly close the stem passageway from the valve body cavity.

In the present invention, the stem passageway is sealed and unsealed by the reciprocating movement of the stem caused by the valve operator, and the sealing of the stem passageway does not depend on the fluid pressure in the valve body cavity. However, fluid pressure in the valve body cavity aids in the sealing function. The valve operator reciprocates the stem and provides the automatic externally variable stem seating force needed to maintain effective sealing of the stem passageway.

"Lift-and-Turn" means and "Lift-Turn-and-Reseat" means are mechanisms by which a rotary valve stem is reciprocated along the stem axis followed by rotary motion of the stem. Some "Lift-and-Turn" means are taught in prior art of Heggem U.S. Pat. No. 2,076,841/Hodgeman et al U.S. Pat. No. 4,234,157/Hilker U.S. Pat. No. 2,383,549/Nevrekar U.S. Pat. No. 5,205,535. Some "Lift-Turn-and-Reseat" means are taught in prior art of Reed U.S. Pat. No. 2,392,880 and Snyder U.S. Pat. No. 2,443,995.

The phrases "Lift-and-Turn" and "Lift-Turn-and-Reseat" means are normally used as applied to unseating and reseating of a rotary valve closure member onto the valve body seats surrounding the fluid flow passageway. The instant invention teaches new uses for the "Lift-and-Turn" means and "Lift-Turn-and-Reseat" means. The new uses refer to unseating and reseating of the rotary valve stem, rather than the closure member, the sequence of motion being very similar.

"Lift-and-Turn" and "Lift-Turn-and-Reseat" means refer to the stem sealing surface being lifted off—moving away from, the stem seating surface. The stem sealing surface needs to be lifted off the stem seating surface just enough to facilitate stem rotation along with the flow control member. This lifting of the stem is generally very small, just enough to relieve stem seat load to facilitate stem rotation with less torque of the valve operator. The lifting of the stem is required to reduce the valve operator torque that is needed to rotate the flow control member, so that the valve operator size can be kept small. The valve operator needs torque to overcome resistance to rotation of the flow control member and also to overcome resistance to rotation of the stem at the stem seating surface in the stem passageway. By lifting the stem sealing surface off the stem seating surface before stem rotation, the torque required to overcome resistance to stem rotation at the stem seat can be greatly reduced.

The lifting and reseating of the stem occurs when the stem reciprocates along the stem passageway. The flow control member is connected to the stem. In rotary valves of the type where the flow control member cannot reciprocate together with the stem, such as a ball valve or a butterfly valve for example, a flexible connection between the stem and the flow control member is called for, whereby the stem can reciprocate relative to the flow control member. In a floating ball valve, this flexible connection already exists in the form of a tongue at the end of the stem sliding in a groove on the ball. The reciprocating movement of the stem tongue inside the ball groove is very small—just enough to relieve stem seat load to facilitate stem rotation. In a rotary cylindrical plug valve with floating side segments or slips, the middle plug can reciprocate with the stem. In a rotary tapered plug valve, the tapered plug can reciprocate with the stem also. Therefore, in a tapered plug valve and in a cylindrical plug valve with side segments, the "Lift-and-Turn" means can be successfully used to seal the stem passageway in the valve open position.

The instant invention is a very simple concept. The concept teaches that a rotary valve stem is back-seated to seal the stem passageway from the valve body cavity, and the valve operator provides the necessary automatic externally variable stem force required to seal the stem passageway. Until now, a "Lift-and-Turn" means is used for lifting the closure member off the valve body seats, and live loading of stem packing is used to contain fugitive emission. However, this invention is a NEW USE concept for the "Lift-and-Turn" means—to PREVENT fugitive emission, not just to contain it—and a novel concept at that.

In summary, the invention consists of providing a back-seat for a rotary valve stem to sealingly close the stem passageway from the valve body cavity, valve operator means to reciprocate the stem, and valve operator means for rotating the stem together with the flow control means, the said valve operator means providing the externally variable stem force that automatically self-adjusts to sealingly close the stem passageway.

An object of the present invention is to isolate the stem packing of a rotary valve from the fluid in the valve body cavity.

Another object of the present invention is to provide for sealing of the stem passageway of a rotary valve stem from the fluid in the valve body cavity.

Another object of the present invention is to prevent fugitive emissions caused by leakage around stem of rotary valves.

Still another object of the present invention is to prolong the life of stem packing of rotary valves.

Other objects and advantages of the present invention will become apparent as the following detailed description of the invention is read in conjunction with the accompanying drawings and the appended claims.

BRIEF DESCRIPTION OF THE DRAWINGS

FIG. 1-A is a fragmentary side view of FIG. 1 looking in the direction denoted by the arrow "A".

FIG. 2-A is a side view of FIG. 2 looking in the direction of arrow "A".

DETAILED DESCRIPTION

Figure 1:
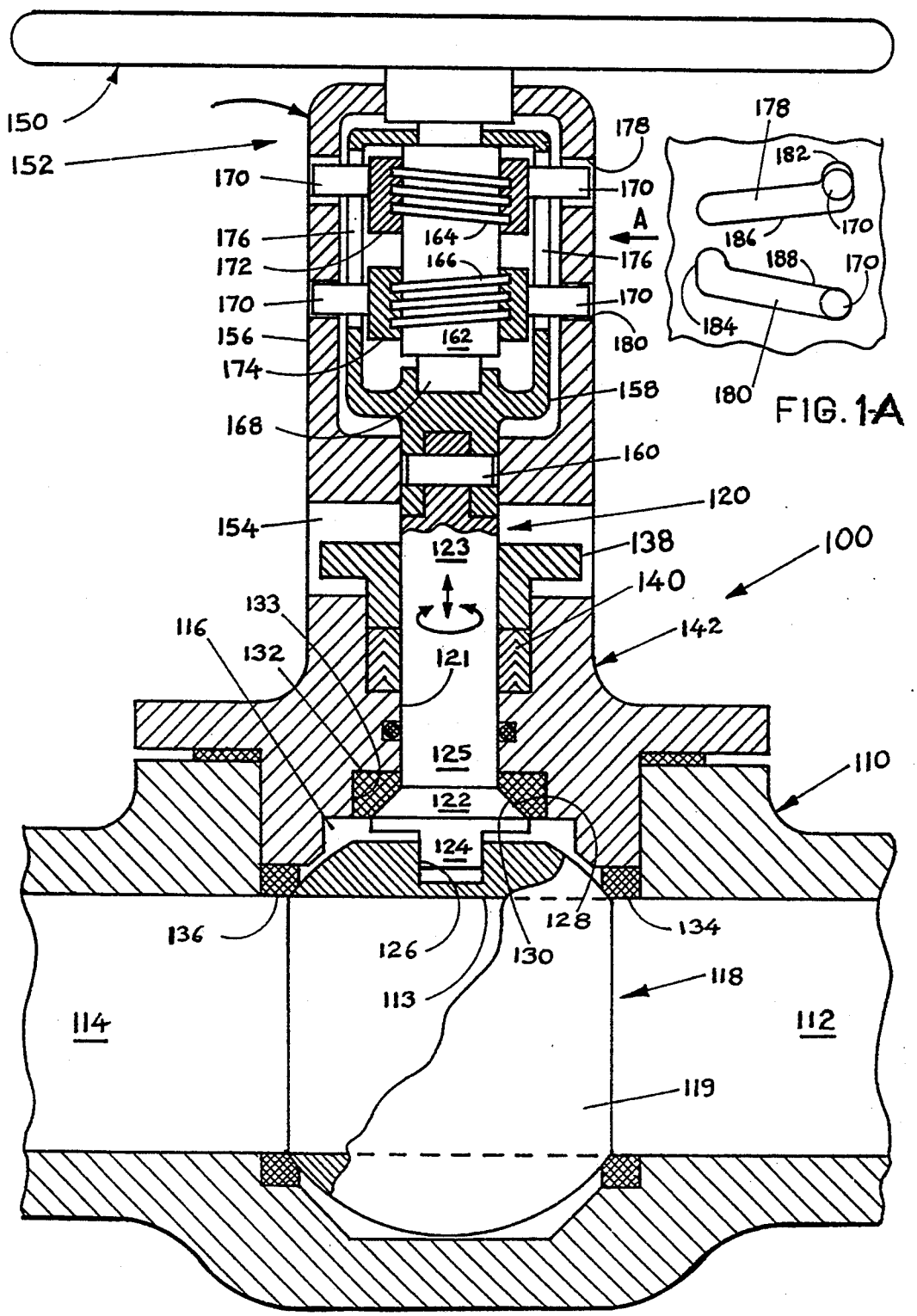
FIG. 1 is a side elevational, cross-sectioned view of a rotary ball valve constructed in accordance with the present invention.

With reference to FIG. 1, the rotary ball valve assembly 100 is shown as constructed in accordance with features of the present invention.

A valve body 110 includes fluid flow passageways 112 and 114 on opposite sides of the valve body cavity 116. The valve body cavity 116 is open to the fluid flow passageways 112 and 114, and also opens upwardly to one side of the valve body 110 to communicate with the bonnet 142.

A flow control member 118 is disposed in the cavity 116 to open or close the fluid flow passageways 112-114. The flow control member 118 comprises a floating ball closure member 119 with a fluid flow conduit 113 therethrough alignable with the fluid flow passageways 112-114. Two sealing rings 134 and 136 are disposed in the valve body 110 surrounding the fluid flow passageways 112, 114 to sealingly engage the ball closure member 119.

The ball closure member 119 is rotated by a valve operator 150 which comprises a stem 120 that passes through the stem passageway 121 in the bonnet 142. The stem passageway 121 communicates with the body cavity 116 and has a stem seating ring 132 disposed in the recess 133 surrounding the stem passageway 121. The upper end 123 of the stem 120 is connected to the valve operator 150 through a lift-turn-and-reseat mechanism 152 by which the stem 120 is reciprocated and rotated. The lower end 125 of the stem 120 passes through the stem passageway 121 and has a narrow tongue 124 that protrudes into an elongated groove 126 in the ball closure member 119. The depth of the groove 126 is more than the length of the tongue 124 so that the tongue 124 can reciprocate in the groove 126 to a limited extent. The tongue 124 is slidingly connected to the ball closure member 119 so that when the stem 120 rotates, the ball closure member 119 rotates with the stem. The lower end 125 of the stem 120 has an enlarged portion with a collar 122 which has a sealing surface 128 complementary to and facing the stem seating surface 130 on the stem seating ring 132. The stem sealing surface 128 sealingly engages the stem seating surface 130 surrounding the stem passageway 121 when the ball valve is in flow closed or in flow open position. The elongated groove 126 is positioned relative to the axis of the conduit 113 so that the floating ball 119 is free to be pushed to the downstream sealing ring in the valve body by fluid pressure in the valve closed position.

A packing gland 138 exerts compressive force on the stem packing 140 surrounding the stem 120. The stem packing 140 in turn exerts radial thrust around the stem 120 to effect sealing engagement therewith around the stem periphery in order to stop leakage of fluid from the valve body cavity. The ball valve is shown in open position in FIG. 1. When the valve operator 150 moves in one direction to close the valve, the stem 120 moves down a limited extent towards the ball closure member, the groove 126 in the ball accommodating this stem movement. The downward movement of the stem 120 causes the sealing surface 128 to move away from the stem seating surface 130 thereby relieving stem seating load on the seating surface 130 and facilitates stem rotation with less effort by the valve operator. With further movement of the valve operator 150 in the same direction, the stem 120 rotates together with the ball closure member 119 through a pre-determined interval of rotation, in this case 90 degrees, to close the fluid flow passageway 112-114 on the downstream side. With continued further movement of the valve operator in the same direction, the stem 120 moves in the opposite direction towards the stem seating surface 130 until the stem sealing surface 128 sealingly engages the stem seating surface 130 thereby sealing the stem passageway 121 from the valve body cavity 116. This sequence of stem movement of unseating, turning and reseating the stem is produced by the lift-turn-and-reseat mechanism 152 referred to earlier.

When the valve operator is moved in the opposite direction to open the ball valve, the said sequence of stem movement is repeated. That is, the stem 120 moves down to relieve stem seat load at stem seating surface 130, rotates through 90 degrees together with the ball closure member 119 and then the stem 120 moves up until the stem sealing surface 128 sealingly engages the stem seating surface 130 to seal the stem passageway 121 from the valve body cavity 116 in the valve open position. Thus, the stem passageway 121 is sealed from the valve body cavity 116 when the valve is in fluid flow closed as well as in fluid flow open position. This sealing is achieved by using the lift-turn-and-reseat mechanism 152 for the stem movement during the opening and closing movement of the valve operator 150, and the stem packing 140 is isolated from the fluid in the valve body cavity 116. Fugitive emissions caused by leakage around the stem are therefore prevented. This also increases the life of the stem packing 140. The automatically externally variable seating force needed for stem sealing is provided by the valve operator 150 through the lift-turn-and-reseat mechanism 152.

Any generic lift-turn-and-reseat mechanism can be used by which the stem is unseated, rotated and then reseated in order to seal the stem passageway. In FIG. 1, the lift-turn-and-reseat mechanism 152 that is shown, is constructed similar to the one disclosed in U.S. Pat. No. 2,392,880, Jan. 15, 1946 by I. N. Reed which is designed for unseating and reseating a tapered plug onto the valve body seats.

The bonnet 142 extends into a yoke 154 to house the packing gland 138. The yoke 154 supports a housing 156 inside which is disposed the lift-turn-and-reseat mechanism 152 which consists of a cage 158 that is connected to the upper end 123 of the stem 120 by means of a cross pin 160. An operative screw 162 with separated external threads 164 (left-hand) and 166 (right-hand), is journaled at 168 in the cage 158. The screws 164, 166 co-act with complementary internally threaded collars 172, 174 respectively. The collars 172, 174 have diametrically opposed pins 170 which protrude through the elongated slots 176 opposite each other and formed in the walls of the cage 158. The slots 176 are parallel to the operating screw 162 axis. For facilitating assembly, the pins 170 are screwed into the collars 172, 174.

The ends of the pins 170 are guided in spirally disposed grooves 178, 180 formed in the housing 156. FIG. 1A shows the disposition of the grooves 178, 180 when looked in the direction of arrow "A" towards the housing 156. The grooves 178, 180 have small vertical portions 182, 184 and inclined portions 186, 188 respectively. FIG. 1A shows the position of the pins 170 in the valve open position, when the stem sealing surface 128 sealingly engages the stem seating surface 130. When the valve operator 150 is turned in one direction to close the valve—in this case clockwise looking from top, the operating screw 162 rotates clockwise. The lower pin 170 being at the end of the groove 180, cannot move down. Therefore the operating screw 164 pushes the collar 172 down along the vertical portion 182 of the groove 178, and this in turn pushes the whole stem 120 down so that the sealing surface 128 moves away from the seating surface 130. With further movement of the valve operator in the same direction, the pins 170 are forced to travel along the inclined portions 186, 188 of the grooves 178, 180 respectively, until the pins 170 reach the end of the inclined portions of the grooves. The guided movement of the pins 170 along the inclined portions of the grooves 178, 180, forces the cage 158 to rotate through a like angle, which again causes the stem 120 and the ball closure member 119, to rotate through a like angle, in this case 90 degrees. With continued rotation of the valve operator 150 in the same direction, the upper pin 170 cannot travel further. The operating screw thread 166 therefore pushes the lower collar 174 upwards along the vertical portion 184 of the groove 180. This in turn pushes the stem 120 upwards so that the sealing surface 128 sealingly engages the seating surface 130 when the valve is in fluid flow closed position. When the valve operator 150 is moved in the opposite direction, in this case counterclockwise looking from top, the sequence of stem movement is repeated—namely, the stem 120 lifts off the stem seating surface 130, rotates through 90 degrees and then reseats onto the stem seating surface 130 to seal the stem passageway 121 from the valve body cavity 116.

The two grooves 178 and 180 together with their respective threaded collars 172 and 174 represent a "lift-turn-and-reseat" mechanism by which the stem is unseated, rotated and reseated onto the same seat when the valve operator is moved in one direction. The sequence is repeated when the valve operator is moved in the opposite direction. However, each of the grooves 178 and 180 individually represents a "lift-and-turn" mechanism by which the stem is unseated and rotated when the valve operator is moved in one direction, and the sequence of stem movement is reversed when the valve operator is moved in the opposite direction.

Figures 2, 2A:
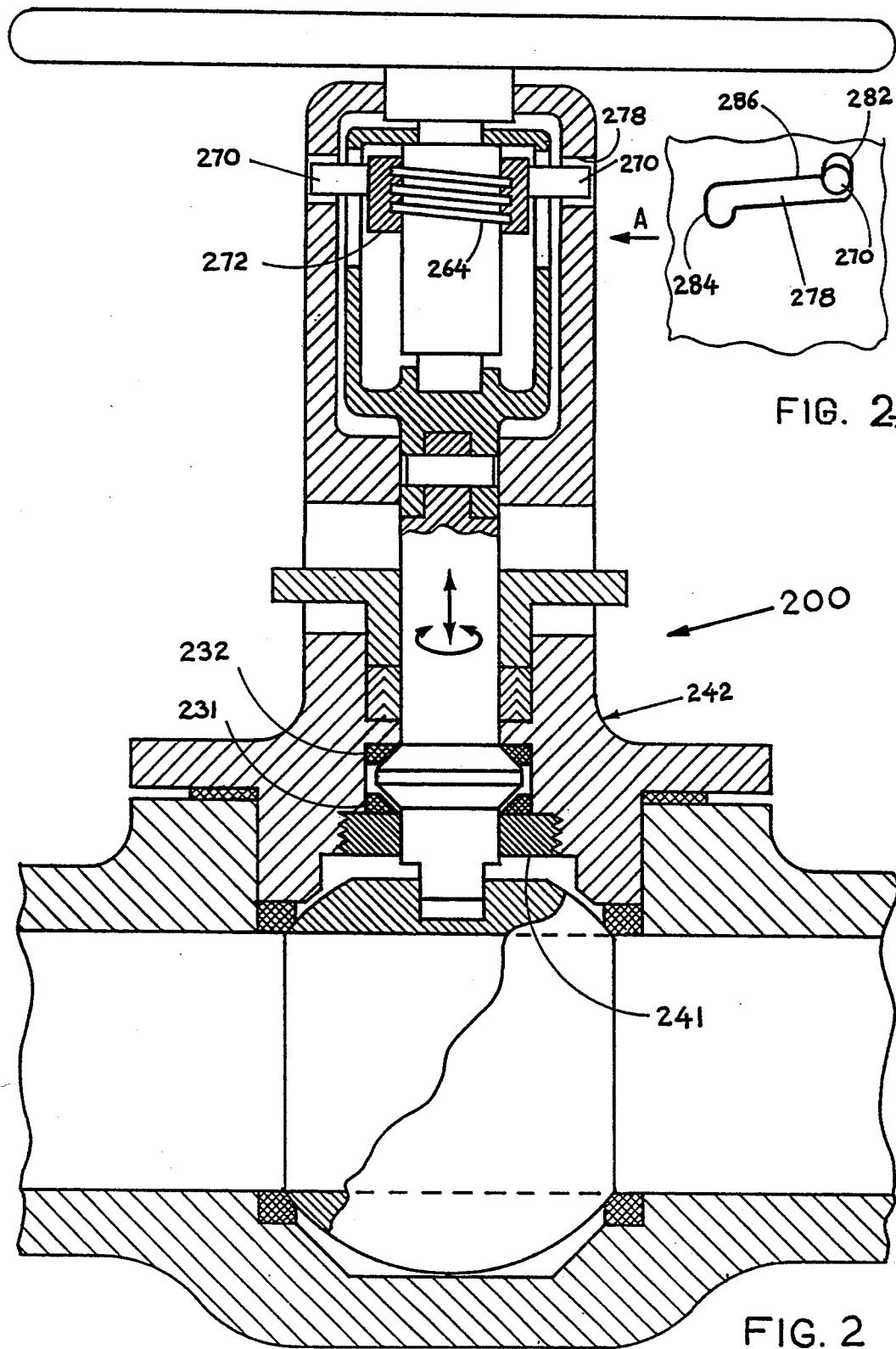
FIG. 2 is another embodiment of the present invention.

FIG. 2 shows another embodiment of the rotary ball valve assembly 200 which has features of the present invention. Since FIG. 2 is very similar to FIG. 1, for the sake of brevity, only important features will be described. FIG. 2 shows a novel construction of the stem by which the stem passageway is sealed in the valve open and in the valve closed position by a "lift-and-turn" mechanism represented by a single groove 278 together with a threaded collar 272. FIG. 2A shows the disposition of the groove 278 as seen in the direction of arrow "A". The groove 278 consists of two vertical portions 282, 284 connected by an inclined portion 286. As in FIG. 1, the stem passageway carries a seat ring 232. A second seat ring 231 is placed below the first seat ring 232 but in opposite configuration. The stem has two sealing surfaces oppositely disposed to each other to co-act with the corresponding seat rings 232, 231. The valve is shown in open position with the stem passageway sealed at the upper seat ring 232. A sturdy clamping plate 241 is screwed into the bonnet 242 to hold the seat rings 232, 231 in place. When the valve operator is moved in one direction to close the valve, the stem is lifted off the first seat ring 232, rotated 90 degrees and with further movement of the valve operator in the same direction, the stem seats on the lower seat ring 231 to seal the stem passageway in the valve closed position. When the valve operator is moved in the opposite direction to open the valve, the stem is lifted off the lower seat ring 231, rotated 90 degrees and with further movement of the valve operator in the same direction, the stem seats on the upper seat ring 232 to sealingly close the stem passageway from the valve body cavity. Thus the stem passageway is sealed from the valve body cavity by the movement of the valve operator in both directions by the "lift-and-turn" mechanism represented by a single groove. It should be clearly understood here that the seat rings 232, 231 can be suitably placed anywhere along the stem passageway, and not necessarily at the bottom of the stem passageway as shown in FIG. 2. Also, the left-hand threaded collar 272 can be replaced by a right-hand threaded collar with the corresponding mirror image groove of groove 278. The grooves can be constructed with different combinations of vertical, inclined and horizontal portions to obtain a desired sequence of stem movement, and this will be apparent to anyone skilled in the art.

In FIGS. 1 and 2, the Lift-and-Turn means shown are as taught in Reed U.S. Pat. No. 2,392,880. There are many other variations of Lift-and-Turn means that can be used for the instant invention. Nevrekar U.S. Pat. No. 5,205,535 shows a lift-and-turn mechanism that is spring activated and can also be used on the instant invention, although it may not be obvious to those skilled in the art.

From the above description it is clear that the present invention is well adapted to carry out the objects and to attain the ends and advantages mentioned herein as well as those inherent in the invention. While presently preferred embodiment has been described for purposes of this disclosure, it will be understood that numerous changes may be made which will readily suggest themselves to those skilled in the art and which are accomplished within the spirit of the invention disclosed and as defined in the appended claims.

What is claimed:

1. A rotary valve comprising;
   a valve body defining a valve body cavity and having a fluid flow passageway therethrough intersecting the valve body cavity, the valve body having a stem passageway in communication with the valve body cavity, the said stem passageway having a stem seating surface surrounding the stem passageway;
   flow control means disposed in the valve body cavity for selectively closing or opening the fluid flow passageway;
   valve operator means connected to the flow control means for selectively moving the flow control means to a flow closed position or to a flow open position, the valve operator means comprising:
   a movable stem passing through the stem passageway and connected to the flow control means so that when the stem rotates, the flow control means and the stem rotate together, the said stem having a stem sealing surface disposed around the stem to sealingly engage the stem seating surface surrounding the stem passageway in order to seal the stem passageway from the valve body cavity; and
   when the valve operator means is moved in one direction to move the flow control means, the stem sealing surface moves a limited extent along the stem axis away from the stem seating surface for facilitating stem rotation, and with further movement of the valve operator means in the same direction, the stem rotates together with the flow control means through a pre-determined interval of stem rotation.

2. In the rotary valve as defined in claim 1, when the valve operator means is moved in opposite direction to move the flow control means:
   the stem rotates together with the flow control means through a pre-determined interval of rotation, and with further movement of the valve operator means in the same direction, the stem sealing surface moves along the stem axis towards the stem seating surface to sealingly engage the stem seating surface surrounding the stem passageway in order to seal the stem passageway from the valve body cavity.

3. The rotary valve of claim 2 wherein the valve operator means further comprises:
   a lift-and-turn means for causing only a reciprocating movement of the stem along the stem axis during a limited interval of movement of the valve operator means and for permitting the flow control means to rotate together with the stem at a time of movement of the valve operator means other than the limited interval.

4. The rotary valve of claim 1 wherein the valve operator means further comprises:
   a lift-and-turn means for causing only a reciprocating movement of the stem along the stem axis during a limited interval of movement of the valve operator means and for permitting the flow control means to rotate together with the stem at a time of movement of the valve operator means other than the limited interval.

5. In the rotary valve as defined in claim 4, the valve operator means further comprising means to reciprocate and rotate the said stem, and the flow control means further comprising means for permitting the stem to reciprocate relative to the flow control means.

6. In the rotary valve as defined in claim 1, the stem seating surface and the stem sealing surface are characterized together as being the first pair of sealing surfaces, the stem passageway and the stem further having a second pair of sealing surfaces disposed along the stem passageway opposite to the first pair of sealing surfaces, and with further movement of the valve operator means in the same direction beyond the pre-determined interval of stem rotation, the stem passageway is sealed from the valve body cavity at the second pair of sealing surfaces.

7. In the rotary valve as defined in claim 6, the valve operator means further comprising means to reciprocate and rotate the said stem, and the flow control means further comprising means for permitting the stem to reciprocate relative to the flow control means.

8. The rotary valve of claim 6 wherein the valve operator means further comprises:
   a lift-and-turn means for causing the flow control means to rotate together with the stem through a pre-determined interval of stem rotation and for permitting the stem only to reciprocate along the stem axis at a time of stem movement other than the pre-determined interval.

9. In the rotary valve as defined in claim 8, the valve operator means further comprising means to reciprocate and rotate the said stem, and the flow control means further comprising means for permitting the stem to reciprocate relative to the flow control means.

10. In the rotary valve as defined in claim 1, the valve operator means further comprising means to reciprocate and rotate the said stem, and the flow control means further comprising means for permitting the stem to reciprocate relative to the flow control means.

11. A rotary valve comprising:
    a valve body defining a valve body cavity and having a fluid flow passageway therethrough intersecting the valve body cavity, the valve body having a stem passageway in communication with the valve body cavity, the said stem passageway having a stem seating surface surrounding the stem passageway;
    flow control means disposed in the valve body cavity for selectively closing or opening the fluid flow passageway;
    valve operator means connected to the flow control means for selectively moving the flow control means to a flow closed position or to a flow open position, the valve operator means comprising:

a movable stem passing through the stem passageway and connected to the flow control means so that when the stem rotates, the flow control means and the stem rotate together, the said stem having a stem sealing surface disposed around the stem to sealingly engage the stem seating surface surrounding the stem passageway in order to seal the stem passageway from the valve body cavity; and when the valve operator means is moved in one direction to move the flow control means, the stem sealing surface moves a limited extent along the stem axis away from the stem seating surface for facilitating stem rotation, the stem then rotates together with the flow control means through a pre-determined interval of rotation, and with further movement of the valve operator means in the same direction, the stem sealing surface moves in the opposite direction along the stem axis towards the stem seating surface to sealingly engage the stem seating surface surrounding the stem passageway in order to seal the stem passageway from the valve body cavity.

12. In the rotary valve as defined in claim 11, the valve operator means further comprising means to reciprocate and rotate the said stem, and the flow control means further comprising means for permitting the stem to reciprocate relative to the flow control means.

13. In the rotary valve as defined in claim 11, when the valve operator means is moved in opposite direction to move the flow control means:

the stem sealing surface moves a limited extent along the stem axis away from the stem seating surface for facilitating stem rotation, the stem then rotates together with the flow control means through a pre-determined interval of rotation, and with further movement of the valve operator means in the same direction, the stem sealing surface moves in the opposite direction along the stem axis towards the stem seating surface to sealingly engage the stem seating surface surrounding the stem passageway in order to seal the stem passageway from the valve body cavity.

14. The rotary valve of claim 13 wherein the valve operator means further comprises:

a lift-turn-and-reseat means for causing only a reciprocating movement of the stem along the stem axis during a limited interval of movement of the valve operator means and for permitting the flow control means to rotate together with the stem at a time of movement of the valve operator means other than the limited interval.

15. The rotary valve of claim 11 wherein the valve operator means further comprises:

a lift-turn-and-reseat means for causing only a reciprocating movement of the stem along the stem axis during a limited interval of movement of the valve operator means and for permitting the flow control means to rotate together with the stem at a time of movement of the valve operator means other than the limited interval.

16. A rotary valve comprising:

a valve body defining a valve body cavity and having a fluid flow passageway therethrough intersecting the valve body cavity, the valve body having a stem passageway in communication with the valve body cavity, the said stem passageway having a stem seating surface surrounding the stem passageway;

flow control means disposed in the valve body cavity for selectively closing or opening the fluid flow passageway;

valve operator means connected to the flow control means for selectively moving the flow control means to a flow closed position or to a flow open position, the valve operator means comprising:

a movable stem passing through the stem passageway and connected to the flow control means so that when the stem rotates, the flow control means and the stem rotate together, the said stem having a stem sealing surface disposed around the stem to sealingly engage the stem seating surface surrounding the stem passageway in order to seal the stem passageway from the valve body cavity when the flow control means is selectively positioned in a flow closed position or in a flow open position, the valve operator means providing the automatically externally variable force to the stem for sealing the stem passageway.

17. The rotary valve of claim 16 wherein the valve operator means further comprises:

a lift-and-turn means for causing only a reciprocating movement of the stem along the stem axis during a limited interval of movement of the valve operator means and for permitting the flow control means to rotate together with the stem at a time of movement of the valve operator means other than the limited interval.

18. In the rotary valve as defined in claim 16, the valve operator means further comprising means to reciprocate and rotate the said stem and the flow control means further comprising means for permitting the stem to reciprocate relative to the flow control means.

19. The rotary valve of claim 16 wherein the flow control means comprises a cylindrical plug having a through conduit alignable with the fluid flow passageway.

20. In the rotary valve as defined in claim 19, the valve operator means further comprising means to reciprocate and rotate the said stem, and the flow control means further comprising means for permitting the stem to reciprocate relative to the flow control means.

* * * * *